3,816,539
METHOD FOR MAKING A STABILIZED SOLUTION OF CONCENTRATED AQUEOUS FORMALDEHYDE
James E. Sanborn, Summit, N.J., William R. Lemmons, Kingsville, Tex., and James M. Ramey, Taponah, N.Y., assignors to Celanese Corporation, New York, N.Y.
No Drawing. Filed Dec. 18, 1968, Ser. No. 785,455
Int. Cl. C07c 47/04
U.S. Cl. 260—606    9 Claims

ABSTRACT OF THE DISCLOSURE

Stabilized, concentrated aqueous formaldehyde, obtained by preparing a warm stabilizing solution of between about 0.5 and 2.0 weight percent polyvinyl formal dissolved in a solvent of concentrated solution of formaldehyde in aqueous methanol, and admixing the stabilizing solution with a warm, concentrated aqueous formaldehyde solution. Admixing is done in such proportions that the concentration of polyvinyl formal in the formaldehyde solution is at least about 1 p.p.m. and most advantageously is between about 2 and 20 p.p.m.

BACKGROUND OF THE INVENTION

(1) Field of the invention

The present invention relates to the stabilization of concentrated aqueous formaldehyde solutions. More particularly it relates to a method for the preparation of concentrated aqueous formaldehyde solution stabilized by relatively large quantities of polyvinyl formal and to the stabilized solutions.

(2) Description of the prior art

Aqueous solutions of formaldehyde precipitate undesirable polymers when stored at room temperature for several days. To minimize polymer precipitation, it is accepted practice to store relatively concentrated solutions of formaldehyde at elevated temperatures. The temperature at which highly concentrated formaldehyde solutions must be stored, however, undesirably increases reactions other than precipitate-forming polymerization, e.g., disproportionation to formic acid and methanol, whereby the concentration of formaldehyde is lowered and the solution becomes objectionably acidic.

To permit the concentrated aqueous formaldehyde solutions to be stored at relatively lower temperatures, thereby minimizing such side reactions, as disproportionation, while effectively inhibiting the precipitation of polymer, various stabilizers, e.g., methanol, urea, or melamine, are conventionally added to formaldehyde solutions. Recently, polyvinyl formal has been shown to have stabilizing effect, but it is highly insoluble in aqueous formaldehyde, and the techniques heretofore employed for adding polyvinyl formal to aqueous formaldehyde are unable to produce concentrations of dissolved polyvinyl formal higher than about one part per million.

SUMMARY OF THE INVENTION

We have now found that higher effective quantities of polyvinyl formal may be added to concentrated formaldehyde solutions without precipitation if the polyvinyl formal is first dissolved in a concentrated solution of formaldehyde dissolved in aqueous methanol to form a stabilizing solution and then the resulting stabilizing solution is added while warm to a warm concentrated aqueous formaldehyde solution. By this method, aqueous formaldehyde solutions having formaldehyde concentrations as high as of the order of 60% have been rendered stable to storage for at least 30 days at the relatively low temperature of 130° F.

Aqueous formaldehyde solutions of any concentration, but usually of concentrations of at least 37% by weight, are made substantially more stable against precipitation, according to the present method, wherein concentrations of at least about 1 p.p.m. and preferably from about 2 to 20 p.p.m. polyvinyl formal in solution are obtained.

DESCRIPTION OF THE PREFERRED EMBODIMENTS

Polyvinyl formal, which is an effective stabilizer for aqueous solutions of formaldehyde, is readily prepared by reacting an aqueous reaction mixture containing polyvinyl alcohol, formaldehyde, and a mineral acid catalyst. This product has a solubility in aqueous formaldehyde of less than $10^{-6}$. It is known that polyvinyl formal may be employed in such concentrations as a substitute for other known stabilizers of formaldehyde, such as methanol, urea, and melamine.

We have found, however, that polyvinyl formal may be more effectively employed as a stabilizer at higher concentrations, of the order of at least about 1 p.p.m., preferably from about 2 to 20 p.p.m., and most preferably, about 10 p.p.m., which concentrations may be obtained according to the method of the present invention.

The polyvinyl formal advantageously should have a molecular weight of from about 200 to 3000 (Number Average). A preferred range is from about 1500 to 2000.

The first step of our method comprises the preparation of a solution of polyvinyl formal in a concentrated solution of formaldehyde in aqueous methanol. (A concentrated solution of formaldehyde in aqueous methanol is commercially available as "Methyl Formal" [the hemiformal of methanol]. Such a solution is readily prepared, as by heating a mixture of methanol and aqueous formaldehyde (85 wt. percent) at 130–190° F. for a few hours until a "cloud point" of 45° F. is reached. The resulting material may then be blended with water, methanol, or both to obtain the desired relative proportions as between the formaldehyde, methanol, and water.)

Relative ranges of formaldehyde, methanol and water making up the solvent for the polyvinyl formal advantageously should be from about 40 to 55 wt. percent formaldehyde, 35 to 50 wt. percent methanol, and from about 9.5 to 10.5 wt. percent water. A preferred range is from about 46 to 55% formaldehyde, 35 to 44% methanol, and 9.5 to 10.5% water. The most preferable composition is 55% formaldehyde, 35% methanol, and 10% water.

To form the polyvinyl formal stabilizing solution, polyvinyl formal is added to the aforesaid formaldehyde-methanol-water solvent in a concentration preferably between about 0.1 and 5% by weight, and more preferably between about 0.5 and 2% by weight. We most preferably add the polyvinyl formal in a concentration of about 1.0%. The polyvinyl formal may be dissolved in the solvent at room temperature, but it is preferred to accelerate dissolution by gentle heating, as to a temperature of the order of 140° F.

An aqueous solution of formaldehyde is prepared and brought to the desired concentration level by conventional means, e.g., concentration may be accomplished in a vacuum evaporator.

The present method may be utilized to increase the stability against precipitation of formeldahyde solutions at concentrations as low as 37% and as high as 60% by weight, although the most useful stabilized solutions have concentrations between about 37 and 57% by weight, and preferably between about 37 and 52.5% by weight.

The concentrated aqueous formaldehyde is heated to a temperature between about 120 and 160° F., preferably between about 130 and 150° F., and most preferably to about 140° F. The polyvinyl formal solution is brought to a temperature within the aforesaid range, and preferably should be brought to at least as high a temperature as that of the formaldehyde solution. The polyvinyl formal solution is then added to the formaldehyde solution in an amount to produce a concentration of polyvinyl formal in the final solution which is preferably between about 1 and 50 p.p.m. We usually find it most advantageous to produce a final polyvinyl formal concentration between about 2.0 and 20 p.p.m., and most preferably of about 10 p.p.m.

It is to be appreciated that the present method is particularly desirable for preparing formaldehyde solutions having a relatively high concentration of polyvinyl formal, although the method is equally applicable to solutions having a lower concentration of the stabilizer.

The following example will serve to illustrate the method of our present invention and to demonstrate its usefulness.

EXAMPLE 1

Polyvinyl formal ("Formvar 7/70," Shawinigan) was dissolved in 55% "Methyl Formcel" (55.0% formaldehyde, 34.5% methanol, and 10.5% water) to produce three solutions containing, respectively, 0.5%, 1.0%, and 2.0% polyvinyl formal. Dissolution was accelerated by gentle heating to 140° F. A formalin solution was concentrated to three desired levels of formaldehyde concentration in a vacuum evaporator, namely, 55.2%, 57.5%, and 60.7%. 100-ml. samples of each of the three formaldehyde solutions at 140° F were then placed in pre-warmed bottles, and 0.1-ml. of one of the stabilizing solutions at 140° F. was added to each sample of formaldehyde solution. A fourth 100-ml. sample served as a "control," no stabilizing solution being added thereto. A fifth 100-ml. sample was treated with "Methocel" (Dow Methyl Cellulose, Type "M," 8,000 cps.), a conventional stabilizer for formaldehyde. No polymer strands were observed.

Each sample was immediately sealed and placed in a constant temperature bath and observed daily for signs of polymerization. Storage tests were terminated when the turbidity of the test sample exceeded a turbidity standard prepared by adding 75 p.p.m. of silica to water.

The results are given in Table 1. It was found that with polyvinyl formal stabilizer, storage for 30 days produced an increase of formic acid (determined by titration with 0.01 normal NaOM to a Bromothymol Blue end point) from an initial value of 0.02% by weight to a final value of 0.04%, a minimal increase.

TABLE 1

| Formaldehyde concentration | Storage temp., °F. | Control 0 | Polyvinyl formal, p.p.m. 5 | 10 | 20 | Methocel comparison, 10 p.p.m. |
|---|---|---|---|---|---|---|
| | | Stability time limit (days) | | | | |
| 55.2% | 120 | <1 | +30 | +30 | +30 | 6 |
| | 130 | 6 | +30 | +30 | +30 | +30 |
| | 135 | +30 | +30 | +30 | +30 | +30 |
| 57.7% | 120 | <1 | <1 | <1 | 6 | <1 |
| | 130 | <1 | +30 | +30 | +30 | 6 |
| | 135 | 6 | +30 | +30 | +30 | 25 |
| 60.7% | 120 | <1 | <1 | <1 | <1 | <1 |
| | 130 | <1 | <1 | <1 | <1 | <1 |
| | 135 | <1 | <1 | 13 | 8 | <1 |

EXAMPLE 2

Utilizing the general procedure described in Example 1, however using aqueous formaldehyde solutions of concentrations of 50, 44, and 37 weight percent, respectively, it was found that these solutions could be effectively stabilized with polyvinyl formal by the method of our invention. The resulting stabilized solutions showed markedly superior stability (1) as compared to similar solutions stabilized with either (a) 10 p.p.m. "Methocel" or (b) 100 p.p.m. "Natrosol" and (2) as compared to an unstabilized "control." The data is given in Table 2.

TABLE 2

| | Minimum permissible storage temperature for 30 days, °F. | | | |
|---|---|---|---|---|
| | | Stabilized with— | | |
| Aqueous formaldehyde | Unstabilized (control) | 10 p.p.m. "Methocel," 8,000 cps. | 100 p.p.m. "Natrosol" | 10 p.p.m. PVF |
| HCHO concentrate, wt. percent: | | | | |
| 50 | 145 | 120 | 120 | 100 |
| 44 | 125 | 90 | 95 | 80 |
| 37 | 90 | 60 | 68 | 55 |

The superiority stability of aqueous formaldehyde stabilized with polyvinyl formal in accordance with the method of our invention is manifest. Note the consistently lower minimum permissible storage temperatures.

Variations can, of course, be made without departing from the spirit of this invention.

Having described our invention, what we desire to secure and claim by Letters Patent is:

1. In the method of stabilizing an aqueous formaldehyde solution with polyvinyl formal, the improvement comprising dissolving from between about 0.1 to 5 percent by weight polyvinyl formal in a solution obtained by mixing formaldehyde aqueous methanol, to thereby form a stabilizing solution, heating said stabilizing solution to a temperature between about 120 and 160° F., heating concentrated aqueous formaldehyde solution to a temperature which is approximately that of said heated stabilizing solution, and admixing said heated stabilizing solution with said heated formaldehyde solution in such proportions as to form a stabilized formaldehyde solution containing at least about 1 p.p.m. of polyvinyl formal.

2. The method of claim 1 wherein said stabilizing solution contains from about 40 to 55 weight percent formaldehyde, from about 35 to 50 weight percent methanol, and from about 9.5 to 10.5 weight percent water.

3. The method of claim 1 wherein the concentration of said concentrated aqueous formaldehyde solution is from about 37 to 60 weight percent.

4. The method of claim 1 wherein said polyvinyl formal has a number average molecular weight of from about 200 to 3000.

5. The method of claim 4 wherein said polyvinyl formal has a number average molecular weight of from about 1500 to 2000.

6. A stabilized, concentrated aqueous formaldehyde solution containing at least about 37 percent by weight of formaldehyde and at least 2 p.p.m. of polyvinyl formal.

7. The solution of claim 6, said solution additionally containing up to about 12 percent by weight of methanol.

8. The solution of claim 7 wherein said polyvinyl formal has a number average molecular weight of from about 200 to 3000.

9. The solution of claim 8 wherein said polyvinyl formal has a number average molecular weight of from about 1500 to 2000.

References Cited

FOREIGN PATENTS

| 838,097 | 6/1960 | Great Britain | 260—606 R |
| 1,129,507 | 10/1968 | Great Britain | 260—606 |
| 518,455 | 12/1955 | Canada | 260—606 |
| 4,109 | 6/1962 | Japan | 260—606 |

OTHER REFERENCES

Walker, F.: Formaldehyde, 3rd edit., 1964, pp. 83–85 and 94–95.

LEON ZITVER, Primary Examiner

R. H. LILES, Assistant Examiner

PO-1050
(5/69)

UNITED STATES PATENT OFFICE
CERTIFICATE OF CORRECTION

Patent No. 3,816,539      Dated 6-11-74

Inventor(s) James E. Sanborn, William R. Lemmons, James M. Ramey

It is certified that error appears in the above-identified patent and that said Letters Patent are hereby corrected as shown below:

In claim 1, line 5, after "formaldehyde" insert -- and --.

Signed and sealed this 4th day of February 1975.

(SEAL)
Attest:

McCOY M. GIBSON JR.
Attesting Officer

C. MARSHALL DANN
Commissioner of Patents